United States Patent
Morse et al.

(10) Patent No.: US 7,836,344 B2
(45) Date of Patent: Nov. 16, 2010

(54) METHOD FOR AUTOMATIC DUMP ASSURANCE

(75) Inventors: Laurie Mueller Morse, Lakeway, TX (US); Dara Lynn Rice, Round Rock, TX (US); Maria Rose Ward, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 11/678,826

(22) Filed: Feb. 26, 2007

(65) Prior Publication Data

US 2008/0209264 A1   Aug. 28, 2008

(51) Int. Cl.
*G06F 11/00* (2006.01)

(52) U.S. Cl. ...................................................... 714/33

(58) Field of Classification Search .................... 714/33, 714/37, 38
See application file for complete search history.

(56) References Cited

U.S. PATENT DOCUMENTS

| | | | |
|---|---|---|---|
| 6,182,243 B1 * | 1/2001 | Berthe et al. ................... | 714/38 |
| 6,226,761 B1 | 5/2001 | Berstis | |
| 7,080,286 B2 | 7/2006 | Chatterjee | |
| 2003/0084374 A1 * | 5/2003 | Chatterjee et al. ............. | 714/33 |
| 2005/0268053 A1 * | 12/2005 | Sexton et al. ................ | 711/159 |

FOREIGN PATENT DOCUMENTS

JP   11-31092   7/1997

OTHER PUBLICATIONS

"AIX System Dump Facility", IBM pSeries and AIX Information Center, retrieved Feb. 19, 2007 http://publib.boulder.ibm.com/infocenter/pseries/v5r3/index.jsp?topic=/com.ibm.aix.kernelext/doc/kernextc/sysdumpfac.htm.

* cited by examiner

*Primary Examiner*—Bryce P Bonzo
(74) *Attorney, Agent, or Firm*—Yee & Associates, P.C.; Diana R. Gerhardt

(57) ABSTRACT

A computer implemented method, an apparatus, and a computer usable program product are provided for adjusting a dump file space in a data processing system. Events with a potential to cause a dump are detected in a data processing system. A dump file size is estimated based on the detected events. The estimated dump file size is compared to the size of an allocated dump file space. A value results from the comparison reflecting the difference between the estimated dump file size and the size of the allocated dump file space. If the allocated dump file space is insufficient to hold a dump file of the estimated size, storage space is reclaimed and the allocated dump file space is expanded to at least the estimated size.

18 Claims, 4 Drawing Sheets

METHOD FOR AUTOMATIC DUMP ASSURANCE

BACKGROUND OF THE INVENTION

1. Field of the Invention

The present invention relates generally to an improved data processing system, and in particular, to a computer implemented method and apparatus for managing error data. Still more particularly, the present invention relates to a computer implemented method, an apparatus, and a computer usable program product for storing a dump file generated in response to an error in the data processing system.

2. Description of the Related Art

Data processing systems occasionally encounter error conditions, which limit the ability of the data processing system to continue performing the data processing system's normal functions. Under certain error conditions, the data processing system may become unstable, stop responding, lose data, and/or even crash, requiring a restart. Severe errors are error conditions that cause these and other similar effects on a data processing system.

An operating system is a collection of software programs that enables a data processing system to perform the data processing system's intended functions. Most operating systems provide a mechanism to save the information, which exists in a data processing system at the time of encountering an error condition. The saved information is useful in diagnosis of the error condition. Users, such as system administrators or software engineers, may also use this type of information to reconstruct the error condition, perform a post-facto analysis of the cause of the error, and restore all or part of the data that was in use on the data processing system at the time of the error condition. A dump is the act or process of saving this information. The result of a dump is a dump file that contains the saved information.

Frequently, a dump file may require space on a data processing system storage device in an amount that reduces performance or storage capability for other purposes. For example, a dump file may be so large as to require several hard disk accesses to read or write the dump file, causing other applications that also need to access the hard disk to wait for their turn to access the hard drive, resulting in the other applications slowing down.

Dump file space is the space that the operating system of a data processing system allocates for a dump file. In most cases, although not necessarily, the dump file and other data on the data processing system share the data processing system's storage devices. Several factors affect the allocation of the dump file space, such as the overall available space on the storage device, and the size of other data occupying the storage space.

Presently, at the startup of a data processing system, a user, usually the system administrator, initializes the space for the dump file at some predetermined size. As the data processing system runs over time, the expected size of the dump file changes depending on factors, such as which applications, and how many applications, are running at a given time. Generally, as the number of running applications increases, larger amounts of data are in use, resulting in more pieces of information being present to be saved in case of an error, and thereby resulting in a larger dump file.

Presently, after initializing the dump file space to some predetermined size, the user periodically adjusts the size of the dump file space using the user's judgment and experience with the data processing system. The user performs this adjustment of the space allocated for the dump file manually. In this adjustment process, the user uses the available space on the storage device, manipulates other data stored on the storage device to make space available, and may also add new storage devices to the data processing system, according to the user's judgment.

As applications run and the data processing system operates, this manual process requires a user to constantly monitor for events occurring on the data processing system. Some of these events have the potential to cause an error condition on the data processing system, and are thus, events with the potential to cause a dump. For example, two different users on the same data processing system may start two applications that are incompatible with each other, thereby creating a potential for a dump. An event in this example is a user starting an application that conflicts with another application. This type of event is one that may cause a dump, and thus is an event with the potential to cause a dump.

Similarly, when the number of active processes or threads exceeds a predetermined threshold, the demand on the resources of the data processing system increases beyond what a user deems a safe resource usage. Starting those additional processes or threads is also an event with the potential to cause a dump.

SUMMARY OF THE INVENTION

The illustrative embodiments provide a computer implemented method, an apparatus, and a computer usable program product for adjusting a dump file space in a data processing system. A dump file size is estimated. The estimated dump file size is compared to the size of an allocated dump file space. A value results from the comparison reflecting the difference between the estimated dump file size and the size of the allocated dump file space. The allocated dump file space is selectively adjusted in response to the comparison.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
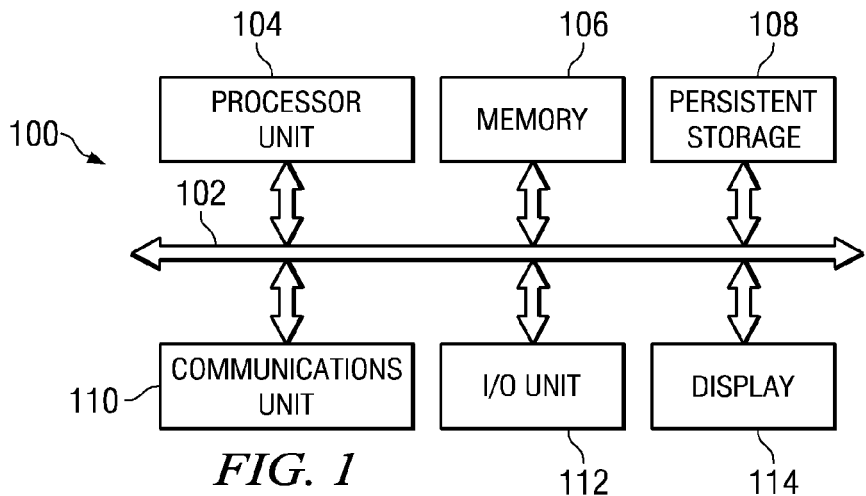
FIG. 1 depicts an exemplary diagram of a data processing environment for implementing an illustrative embodiment.

With reference now to the figures and in particular with reference to FIG. 1, the figure provides an exemplary diagram of a data processing environment for implementing illustrative embodiments. Note that FIG. 1 is only exemplary and does not assert or imply any limitation with regard to the environments for implementing different embodiments. One of ordinary skill in the art may make many modifications to the depicted environments.

Turning now to FIG. 1, the figure depicts a diagram of a data processing system in accordance with an illustrative embodiment. In this illustrative example, data processing system 100 includes communications fabric 102, which provides communications between processor unit 104, memory 106, persistent storage 108, communications unit 110, I/O unit 112, and display 114.

Processor unit 104 serves to execute instructions for software that may be loaded into memory 106. Processor unit 104 may be a set of one or more processors or may be a multiprocessor core, depending on the particular implementation. Further, processor unit 106 may be implemented using one or more heterogeneous processor systems in which a main processor is present with secondary processors on a single chip. Memory 106, in these examples, may be, for example, a random access memory. Persistent storage 108 may take various forms depending on the particular implementation. For example, persistent storage 108 may be, for example, a hard drive, a flash memory, a rewritable optical disk, a rewritable magnetic tape, or some combination of the above.

Communications unit 110, in these examples, provides for communications with other data processing systems or devices. In these examples, communications unit 110 is a network interface card. I/O unit 112 inputs and outputs data with other devices that may be connected to data processing system 100. For example, I/O unit 112 may provide a connection for user input though a keyboard and mouse. Further, I/O unit 112 may send output to a printer. Display 114 provides a mechanism to display information to a user.

Instructions for the operating system, the object-oriented programming system, and applications or programs are located on persistent storage 108. These instructions may be loaded into memory 106, and processor unit 104 executes these instructions. Processor unit 104 performs the processes of the different embodiments using computer implemented instructions, which may be located in a memory, such as memory 106.

FIG. 1 depicts an exemplary environment, and not an architectural limitation for different embodiments. The hardware in FIG. 1 may vary depending on the implementation. One of ordinary skill in the art may use other internal hardware or peripheral devices, such as flash memory, equivalent non-volatile memory, or optical disk drives and the like, in addition to or in place of the hardware depicted in FIG. 1. In addition, the processes of the illustrative embodiments may apply to a multiprocessor data processing system.

In some illustrative examples, data processing system 100 may be a personal digital assistant (PDA), which generally includes a flash memory to provide non-volatile memory for storing operating system files and/or user-generated data. A bus system may comprise one or more buses, such as a system bus, an I/O bus and a PCI bus. Of course, one may implement the bus system using any type of communications fabric or architecture that provides for a transfer of data between different components or devices attached to the fabric or architecture. A communications unit may include one or more devices used to transmit and receive data, such as a modem or a network adapter. A memory may be, for example, main memory 106, or a cache such as found in a bridge or memory controller hub. A processing unit may include one or more processors.

FIG. 1 and the above-described examples do not mean to imply architectural limitations on the illustrative embodiments. For example, data processing system 100 also may be a tablet computer, laptop computer, or telephone device in addition to taking the form of a PDA.

When a data processing system encounters error conditions, the data processing system may become unstable, stop responding, lose data, and/or even crash. When such errors occur, a risk of data loss exists in the data processing system.

Most operating systems provide a mechanism to save the information existing at the time of encountering error conditions in dump files. Depending on the configuration of the operating system, the dump files can contain system-wide information, application specific information, user specific information, current state of the system memory, error causing instruction, and many other details. Naturally, a collection of all this detailed information can result in a dump file having a size that reduces performance in the data processing system, or reduces the amount of other data that may be stored on a storage device.

The different embodiments recognize that one reason the dump file is important is because a user, such as a system administrator, a software engineer, or some other user with appropriate privileges, may use the dump file to diagnose the error condition, restore lost data, and take steps that will reduce the chances of the error condition occurring again. Because the users of the dump file can use the data in the dump file for maintaining the data processing system in a proper operating condition in this manner, the users can better perform these steps if more data is available in the dump file.

The illustrative embodiments recognize that sometimes a dump file remains incomplete because the space allocated for writing the dump file is insufficient for storing all of the information put into the dump file when a dump occurs. When the space allocated for the dump file is insufficient at the time of an error condition, critical system data may be lost and be unavailable to the user later. Without the needed information to analyze the error condition, the purpose of creating the dump file is defeated.

A user may select the space allocated for a dump file according to his/her judgment. Alternatively, the user may utilize guidelines provided by the various applications and operating systems for allocating the dump file space. Operating systems can also automatically allocate a dump file space of a default size at system startup and then allow a user to adjust that size as needed.

The illustrative embodiments further recognize that having a user manually adjust the size of the dump file space is slow and error prone because of the amount of data that the user needs to oversee, collect, and manipulate. Therefore, the manual adjustment of the size of the allocated dump file space fails to meet the dump file size requirements in many instances. For example, the illustrative embodiments recognize that the user may not be able to monitor the state of the data processing system all the time that the data processing system is in operation. As a result, the user may not timely catch an event with the potential to cause a dump. Consequently, the user may not be able to increase the dump file space in time to save a dump file larger than the previously allocated dump file space.

As a second example, the illustrative examples recognize that the user may be aware that the dump file space should be increased, but may not be able to increase the size of the dump file space because no free space is available on the storage device. In this case, the user has to determine how to reclaim storage space before the user can increase the dump file space. Such a manual determination is time consuming and error prone partially due to the amount of data that needs to be handled during the reclaiming actions. Reclaiming of storage space is freeing up storage space that is otherwise occupied by data, such as files and directories, in a data processing system. Reclaiming actions are actions on the files and directories to free up at least some of the storage space the files and directories occupy. Some examples of reclaiming actions are purging, compressing, and relocating files in a data processing system. Purging involves actions such as deletion of files; compressing involves actions such as making the files smaller by using a data compression technique; and relocating involves actions such as moving the files to a new location, possibly on another storage device, to free up storage space where the files are stored.

Therefore, the different embodiments recognize that a computer implemented method, an apparatus, and a computer program product for automatic adjustment of dump file space to assure that a dump file fits completely in the dump file space would be useful for managing data for later analysis when an error requiring a dump of data occurs. The illustrative embodiments describe such a computer implemented method, an apparatus, and a computer program product below.

Figure 2:
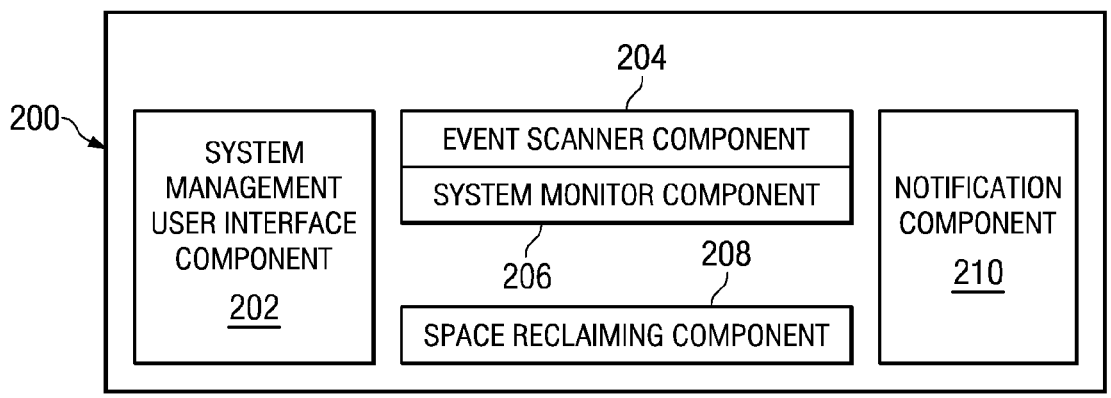
FIG. 2 depicts a block diagram of a system for automatic adjustment of dump file space in accordance with an illustrative embodiment.

With reference now to FIG. 2, the figure depicts a block diagram of a system for automatic adjustment of dump file space in accordance with an illustrative embodiment. The block diagram shows the components of system 200 for automatic adjustment of dump file space. One of ordinary skill in the art can implement system 200 in software that can run under an operating system in a data processing system. FIG. 2 is only an exemplary depiction of the system for automatic adjustment of dump file space in software and does not limit the illustrative embodiment. From this disclosure, one of ordinary skill in the art will be able to implement the depicted components in software, hardware, or a combination thereof, to operate under a given operating system for specific data processing system configurations.

Figures 4, 5:
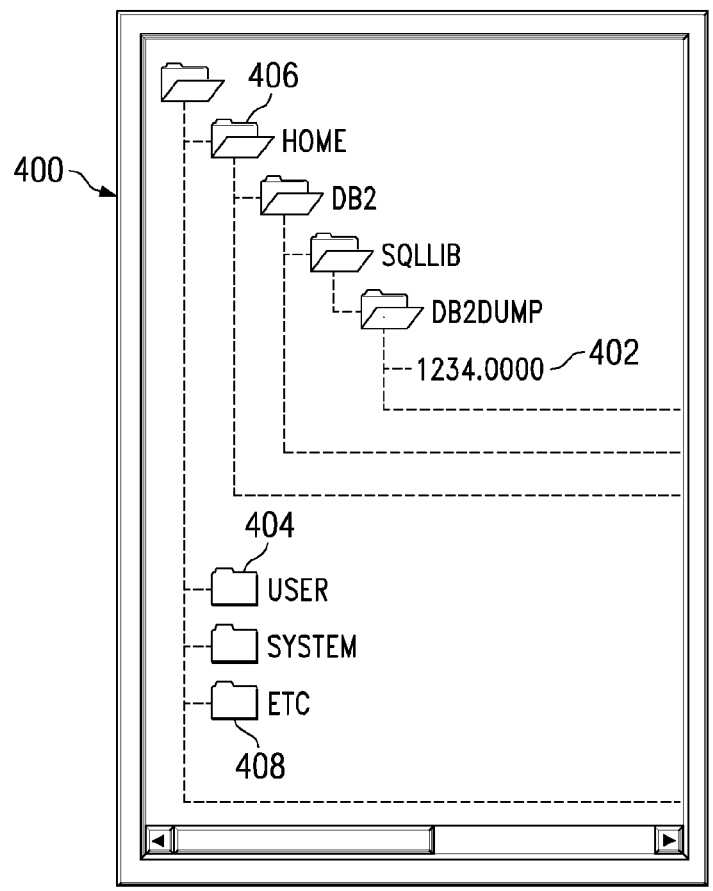
FIG. 4 depicts a logical view of a storage device in accordance with an illustrative embodiment.
FIG. 5 depicts an exemplary graphical user interface in accordance with an illustrative embodiment.
Figure 6:
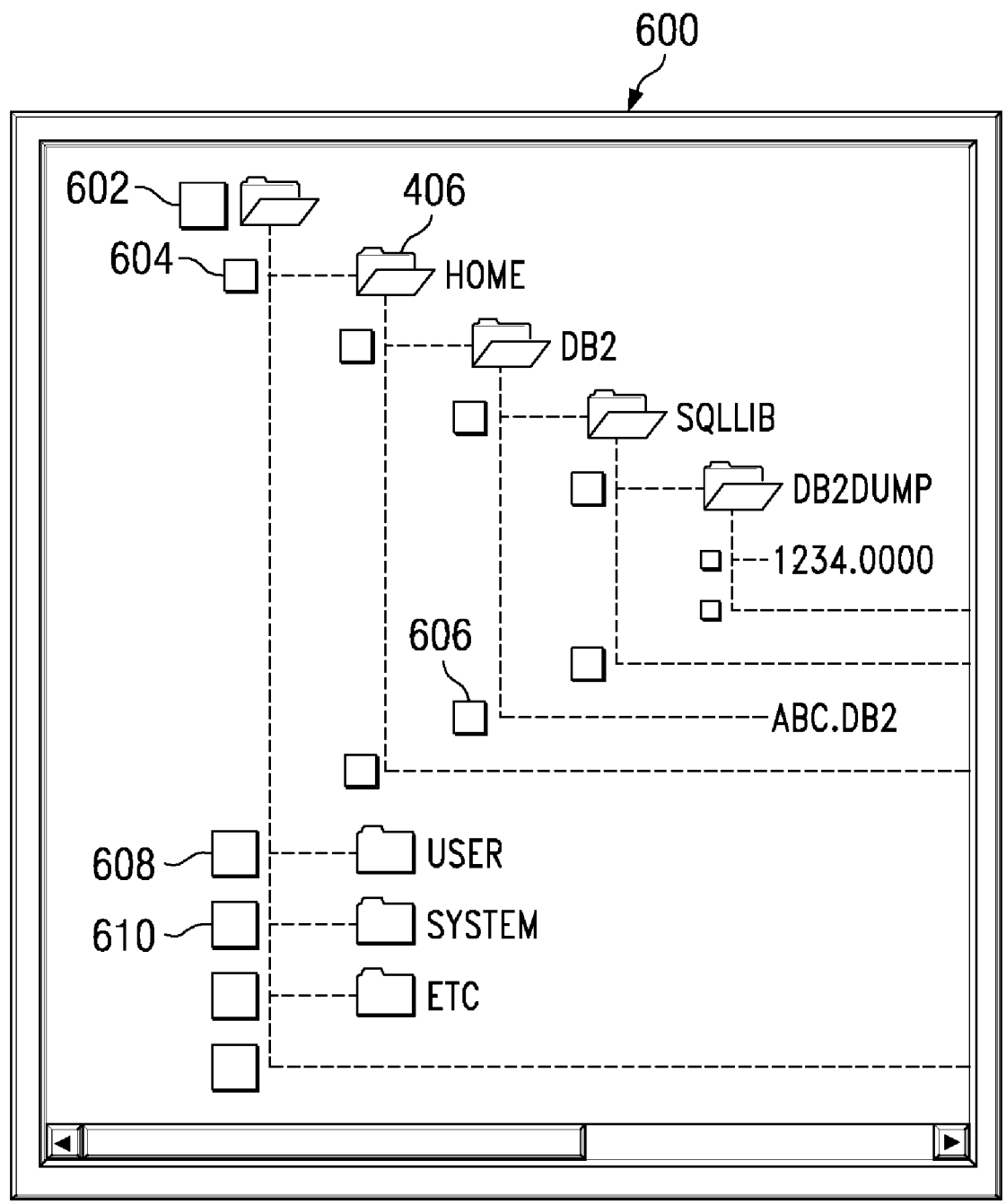
FIG. 6 depicts a graphical user interface showing a modified logical view of a storage device in accordance with an illustrative embodiment.

Component 202 provides the system management user interfaces, including but not limited to those illustrated in FIGS. 5 and 6. Event scanner component 204 scans for events that have the potential for causing a dump. Event scanner component 204 may additionally monitor the system resources by utilizing a system monitoring API through system monitor component 206.

Event scanner component 204 and system monitor component 206 may be the same component or distinct components in specific implementations. In specific configurations, components 204 and 206 may also monitor for relevant events according to the schedule specified by a user, or continuously monitor events as they occur in a data processing system.

Components 204 and 206, together or separately, also estimate the size of the dump file expected based on the events components 204 and 206 detect. Space reclaiming component 208 uses this estimate to determine how much storage space to reclaim, if at all.

Space reclaiming component 208 reclaims storage space by performing reclaiming actions, such as purging, compressing, and relocating, on the files and directories indicated by the user. Space reclaiming component 208 reclaims storage space when needed for increasing the dump file space on the storage device. In specific implementations, reclaiming can stop when space reclaiming component 208 has reclaimed enough storage space to sufficiently to hold the estimated size of the dump file. Notification component 210 provides support for notifying one or more users through the preferred mode of communication, for example, as indicated in fields 508-512 in FIG. 5 below.

This illustration of components only describes the functionality of the system for automatic adjustment of dump file space in an exemplary way, and is not limiting on the illustrative embodiments. Those of ordinary skill in the art will find other ways of creating the various components are implementation dependent and apparent from this disclosure.

Figure 3:
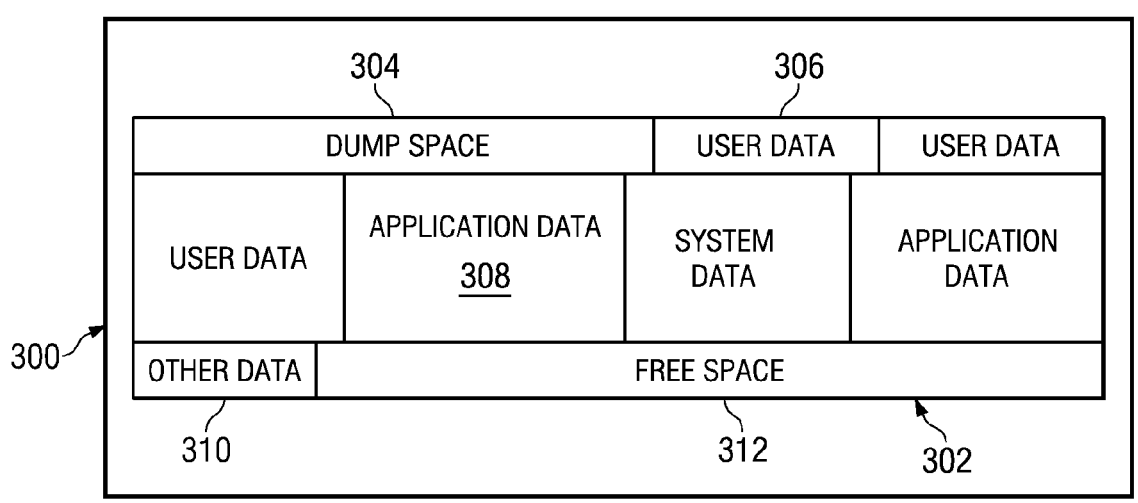
FIG. 3 depicts a block diagram of a storage device in accordance with an illustrative embodiment.

With reference now to FIG. 3, the figure depicts a block diagram of a storage device in accordance with an illustrative embodiment. FIG. 3 depicts the block diagram of the storage device in a conceptual manner in order to facilitate the description of the illustrative embodiment. The depiction does not reflect the actual organization of data in a storage device. One can implement storage device 300 using persistent storage 108 in data processing system 100 in FIG. 1.

Storage device 300 provides storage space 302 for storage of data on a data processing system. Generally, any combination of the users of the data processing system, applications loaded on the data processing system or the operating system, and other miscellaneous usages, can share storage space 302. The miscellaneous usages include the dump file space. At any given time, storage space 302 may contain dump file space 304 of a selected size. The selected size may be, for example, user selected, a default size, or selected by a program or process.

At the same time, storage space 302 may also store user data 306, application data 308, and other data 310, as FIG. 3 depicts in the conceptual block diagram. Storage space 302 may also contain free space 312. The operating system or a user, such as a system administrator, a software engineer, or a user with appropriate privileges, may allocate free space 312 for any use, such as giving more space to a user, or expanding the dump file space to accommodate a larger dump file.

The specific types of data and their relative organizations described above are only exemplary and are not limiting on the illustrative embodiments. Nature of data stored, and the organization thereof on a storage device is implementation specific on each data processing system. Those of ordinary skill in the art can conceive many variations of the same from this disclosure.

Furthermore, the storage space may span more than one storage device. The illustrative embodiments equally apply to data processing system configurations that use multiple storage devices to provide the necessary storage space.

With reference now to FIG. 4, this figure depicts a logical view of a storage device in accordance with an illustrative embodiment. Logical view 400 shows a directory structure of a file system located on a storage device, such as storage device 300 in FIG. 3. FIG. 4 shows file 402, which is a dump file, as residing in a directory in the file system, with a logical path in this exemplary depiction as /home/db2/sqllib/db2dump/1234.0000. Logical view 400 corresponds to storage device 300 shown in FIG. 3. User data 306 in FIG. 3 can appear in user directory 404 in logical view 400. Similarly, application data 308 in FIG. 3 can appear in home directory 406. Likewise, other data 310 in FIG. 3 can appear in etc directory 408.

Again, the file system, the directories, and the files, including dump file 402 in FIG. 4 are only exemplary, and are not limiting on the illustrative embodiments. A user can create a dump file in any directory of choice in a given file system, subject to the limitations imposed by the operating system in a given implementation.

A part of the system for automatic adjustment of dump file space, such as system 200 for automatic adjustment of dump file space in FIG. 2, can also be an application that resides on the storage space. For example, components 202-210 in FIG. 2 can reside on the storage space, such as in application data 308 in storage device 300 in FIG. 3. These components can then appear separately or in a combined representation under home directory 406 in logical view 400 in FIG. 4. The system for automatic adjustment of dump file space provides a user interface for configuring the data processing system to utilize the illustrative embodiments.

With reference now to FIG. 5, the figure depicts an exemplary graphical user interface in accordance with an illustrative embodiment. Graphical user interface 500 contains data fields for use by a user to configure the data processing system to use the system for automatic adjustment of dump file space, such as system 200 for automatic adjustment of dump file space in FIG. 2. System management user interface component 202 in FIG. 2 can present graphical user interface 500.

As an example of the data fields, graphical user interface 500 contains field 502, which a user can use for specifying the period at which the system for automatic adjustment of dump file space should scan the data processing system for events with the potential to cause a dump. Events with potential to cause a dump can be specific operating system events, or events resulting from user actions. In addition to the above examples of events with a potential to cause a dump, other examples of such events can be a hung process, and expanding use of memory by a process beyond a predetermined period of time. In the case when the scan identifies one or more events, a user can choose to receive a notification by indicating in field 503.

The scan can cover numerous types of events. For example, the specific operating system supports certain events, users create other events, and applications running on the data processing system provide still more events. These events are only exemplary for describing the illustrative embodiments. Those of ordinary skill in the art will be able to conceive many other events from this disclosure.

Graphical user interface 500 contains data field 504 for specifying the period at which the system for automatic adjustment of dump file space should scan the data processing system's storage space. The system for automatic adjustment of dump file space, such as system 200 in FIG. 2, uses this scan to determine if free space is available on the storage device, should the dump file space need to be expanded. If available free space is insufficient for accommodating the dump file, the system for automatic adjustment of dump file space determines how to reclaim the storage space. To wit, the system for automatic adjustment of dump file space determines which files or directories can be purged, compressed, or relocated to create sufficient space for dump file space expansion.

Again, the user can choose to be notified about the actions of the system for automatic adjustment of dump file space during the storage space scans by selecting field 506. The description of FIG. 6, below, shows one way of determining the files and directories to purge, compress, or relocate, in accordance with an illustrative embodiment.

Continuing with the description of FIG. 5, the user can indicate how the user should be notified by entering appropriate information, such as an email address or a telephone number, in field 508. Specific implementations of the illustrative embodiments may support more than one contact, and more types of contact information, such as a pager, an instant message, or a facsimile.

The system for automatic adjustment of dump file space, such as system 200 in FIG. 2, determines if and when storage space should be reclaimed based on the information indicated above. Additionally, the user can indicate, by using field 510, whether to free the space automatically, or alert the user and let the user manually control the process of freeing up the storage space.

A further distinction is possible between groups of data, in how each group is treated for freeing up storage space and what reclaiming actions are actionable on each group. For example, if user data, such as user data 306 in FIG. 3, is to be purged, compressed, or relocated, the user can indicate, using field 512, whether to automatically take the action, notify the user, or take another action, such as notify the owner of the user data and let he/she take the reclaiming action.

Additionally, most operating systems provide some resource management functionality through an application programming interface (API). As an alternative, a user can indicate in field 514 whether the illustrative embodiment should use the operating system API to gain information about system resource usage. For example, Advanced Interactive eXecutive (AIX™) operating system, manufactured by International Business Machines Corporation (IBM™), provides a Workload Manager application (WLM) with API that can provide such information. Typically, an operating system can provide information about the number of applications currently running, and amount of memory used and loaded on the processor, through such API.

Through such API, the operating system can also inform about the number of applications running in the operating system kernel space and the application space. Illustrative embodiments recognize the higher number of applications that are running in the kernel space, the higher the chances of a system crash resulting in a dump. Thus, the information received through such API indicates events, including events with the potential to cause a dump, in a data processing system. Consequently, illustrative embodiments can utilize the API to detect events that have the potential to cause a dump while scanning for events according to the user's specification in field 502.

Generally, the system for automatic adjustment of dump file space, such as system 200 in FIG. 2, detects the events for computing the estimated size of the dump file if one of those events should cause a dump. For example, by detecting an event about the number of running applications exceeding a threshold, the system for automatic adjustment of dump file space can estimate the size of the dump file to be at least the total size of data in the memory, the size of data in the paging space, and the size of uncommitted data elsewhere in the data processing system. The system for automatic adjustment of dump file space may estimate the size of the dump file differently for each event, taking into account the nature of the event and the data that has to be saved in the dump file.

The fields in graphical user interface 500 are exemplary and are not limiting on the illustrative embodiments. FIG. 5 depicts the fields in order to illustrate the specific details of the system for automatic adjustment of dump file space in accordance with an illustrative embodiment. Those of ordinary skill in the art will find many other data fields useful to a user in a given data processing system configuration apparent from this disclosure.

With reference now to FIG. 6, the figure depicts a graphical user interface showing a modified logical view of a storage device, such as logical view 400 in FIG. 4, in accordance with an illustrative embodiment. System management user interface component 202 in FIG. 2 can present this graphical user interface. FIG. 6 depicts modifications to the logical view of the storage device to include data fields along side each file or directory in graphical user interface 600. A user may enter data into data fields 602-610 to specify how the system for automatic adjustment of dump file space is to treat the associated directory or file for reclaiming storage space.

The user may specify this information for a set of files. In these examples, a set of files is a group of zero or more data files and directories in a data processing system. For example, data field 602 is associated with the root directory, data field 604 is associated with the home directory, data field 606 is associated with a file abc.db2, data field 608 is associated with the user directory, and data field 610 is associated with the system directory. A user can input a numeric value in each of these data fields, for example, ranging from 1 to 3, where the numbers indicate the relative priority of the directories or files. A user can similarly provide a numeric value in the data fields adjacent to all the directories and files that the user wants to scan during storage space scan. The user can configure the illustrative embodiment such that the system for automatic adjustment of dump file space, such as system 200 in FIG. 2, does not purge, compress, or relocate the files and directories with priority 1; compresses or relocates as needed those files and directories with priority 2; and purges those files and directories with priority 3.

Alternatively, the user can specify other indicators in the data fields, such as data fields 602-610. Through these indicators, the user can specify whether the system can purge, compress, relocate, or should not touch the associated file or directory. The user can use numeric, symbolic, alphanumeric, or any combination thereof of any length, as the indicators for this purpose.

The above examples of these indications are not limiting on the illustrative embodiments. Many other ways of indicating the actions that are allowed on files and directories in the storage space are possible according to specific implementations.

Generally, the graphical user interfaces, and the fields depicted therein in FIGS. 5 and 6 only describe the functioning of the illustrative embodiments in exemplary ways. Those of ordinary skill in the art will find many refinements, additions, and modifications to the interfaces apparent from this disclosure.

Figure 7:
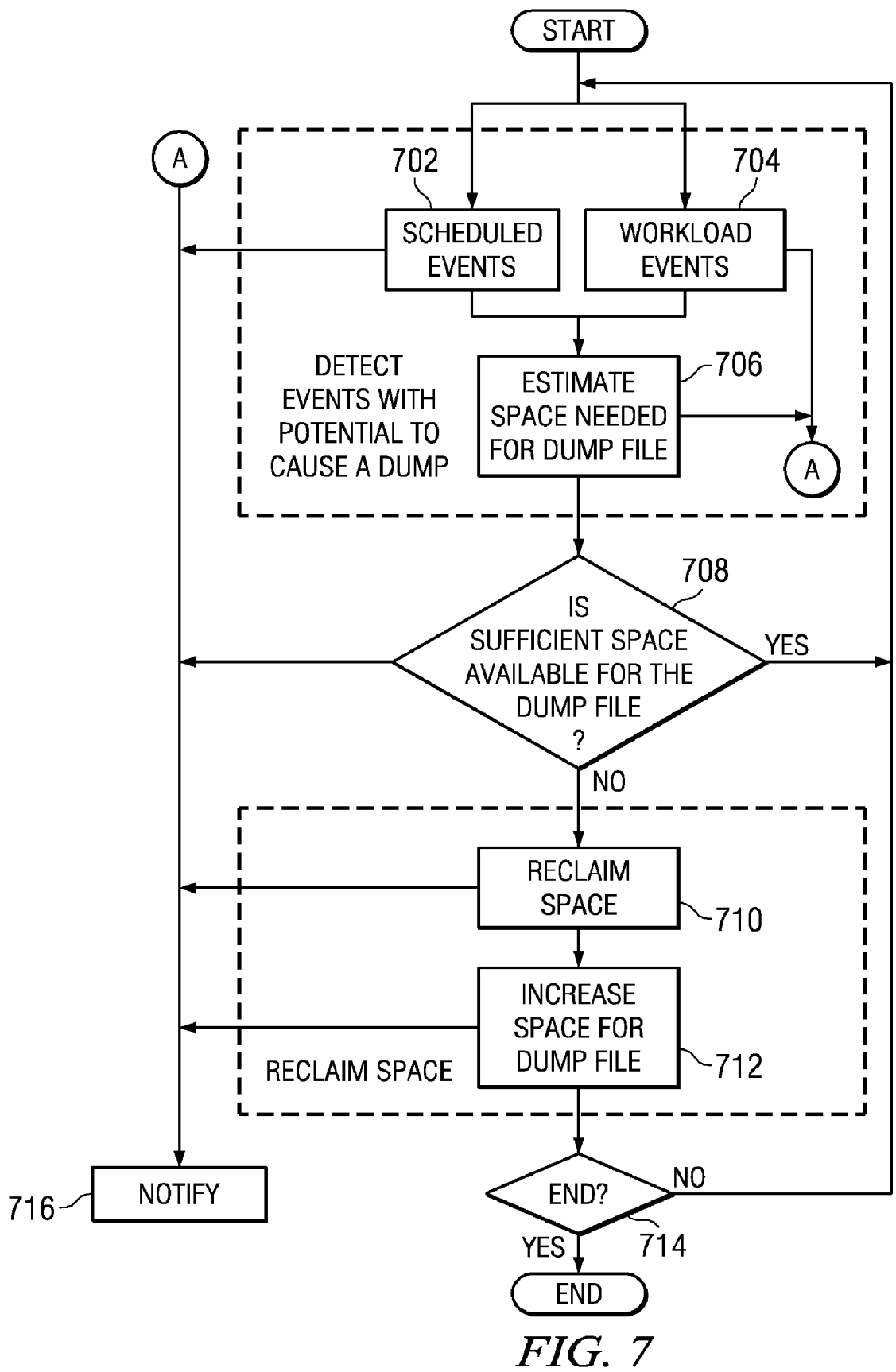
FIG. 7 depicts a flowchart of a process of automatic adjustment of dump file space in accordance with an illustrative embodiment.

With reference now to FIG. 7, the figure depicts a flowchart of a process of automatic adjustment of dump file space in accordance with an illustrative embodiment. One of ordinary skill in the art can implement the process in the system 200 for automatic adjustment of dump file space in FIG. 2.

The process begins by scanning for events that can cause a dump. The process performs the scan for events on a scheduled basis (step 702). The process also continuously monitors for events generated by the operating system depending on the workload, for example, the number of applications running in kernel and application spaces, and system resource usage (step 704). Based on the result of the scheduled scan and continuous monitoring for events that have the potential to cause a dump, the process estimates a size of the dump file, should a dump create a dump file (step 706).

Next, based on the estimate generated in step 706, the process determines if sufficient storage space is available on the storage device to store the dump file if a dump creates a dump file (step 708). If the process determines that the space available on the storage device is sufficient for this purpose, the process returns to scanning for events with the potential to cause a dump ("yes" output to step 708).

If the process determines in step 708 that the storage space on the storage device is insufficient to hold the dump file of the estimated size, the process proceeds to the next step in the process ("no" output to step 708). Following the "no" path of step 708, the process reclaims storage space (step 710). As described with respect to FIGS. 2, 5 and 6 above, the reclaiming step can proceed by purging, compressing, or relocating files and directories for which the user has set appropriate indications.

Reclaimed storage space, or reclaimed space, is the storage space reclaimed in this manner. Once the process has reclaimed sufficient storage space to hold a dump file of the size estimated in step 706, the process increases the allocated dump file space (step 712).

The process can continue in a loop in this manner for as long as a user requires the process to run. The process determines whether the process should continue or end (step 714). To make this determination, the process can receive an input from a user who may be monitoring the process, or the process can simply repeat based on a rule, a policy, or a condition. If the process continues, the process runs again as described above ("no" output to step 714). Otherwise, the process ends ("yes" output to step 714).

The process can notify a user at any step in the process (step 716). FIG. 7 shows the process can generate a notification of step 716 if the process detects an event with the potential to cause a dump during a scheduled scan. The process can also generate the notification if an event with the potential to cause a dump is detected during the continuous monitoring of workload events.

Furthermore, the process can generate the notification of step 716 upon estimating the size of the dump file. If the storage space available is insufficient to hold the estimated size of the dump file, the process can generate the notification again.

Similarly, when the process is reclaiming storage space, the process can generate notifications to the users. The process can also generate the notification of step 716 upon identification of directories and files to be reclaimed, but before purging, compressing, or relocating those directories and files. The process can also generate the notification of step 716 once the storage space is reclaimed.

The process can also generate the notification of step 716 once the process has increased the dump file space to a size that can hold the estimated size of the dump file. Particular implementations of the process of FIG. 7 can break down each shown step further into a series of more granular steps. Conversely, an implementation of the process can also combine various steps. FIG. 7 depicts the functioning of the process of automatic adjustment of dump file space, and not a specific way to implement the process, and therefore is not limiting on the illustrative embodiments.

Thus, a data processing system can benefit from having a system for automatic adjustment of dump file space as described above. An automatic process for adjusting the dump file space provides assurance that sufficient space will be available to hold an estimated size of a complete dump file, should a dump occur in the data processing system. Illustrative embodiments provide a computer implemented method and apparatus for automatic adjustment of dump file space. Illustrative embodiments estimate the size of the dump file if one can be created, and compare the estimated size to the allocated dump file space. Illustrative embodiments then take steps to reclaim additional storage space for expanding the allocated dump file space if the allocated dump file space is insufficient to hold a dump file of the estimated size.

Such an automatic process also frees the user from continuously monitoring for events and adjusting storage space manually. Additionally, the illustrative embodiments remove or reduce the risk of loss of dump file data that is otherwise present when a user manually adjusts the dump file space.

The illustrative embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the illustrative embodiments has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for adjusting a dump file space in a data processing system, the method comprising:
   allocating the dump file space in a storage space at a startup of the data processing system;
   receiving an indication of a storage space scanning interval;
   in response to each end of the storage space scanning interval, scanning the storage space to determine if free space is available in the storage space into which the dump file space can be expanded;
   receiving an indication of an event scanning interval; and
   in response to each end of the event scanning interval, determining if an event that has a potential to cause a dump has been detected;
   in response to detecting the event:
      estimating, by a first software component, a size of a dump file to form an estimated dump file size;
      comparing in the first software component a size of the allocated dump file space to the estimated dump file size to determine if the estimated dump file size exceeds the size of the allocated dump file space; and
      in response to determining that free space is available in the storage space and to determining that the estimated dump file size exceeds the size of the allocated dump file space: expanding, by a second software component, the allocated dump file space into the free space to form an expanded dump file space.

2. The computer implemented method of claim 1, wherein the detecting step comprises:
   in response to receiving an indication that a system application programming interface (API) should be used to monitor the data processing system's resource usage, continuously monitoring for events generated by an operating system that have a potential to cause a dump; and
   in response to detecting events that have the potential to cause a dump, performing the estimating, comparing, and expanding steps.

3. The computer implemented method of claim 1, wherein the expanding step comprises:
   reclaiming storage space by the second software component if the size of the allocated dump file space is less than the estimated dump file size to form a reclaimed space; and
   expanding, by the second software component, the dump file space into the reclaimed space to form the expanded dump file space.

4. The computer implemented method of claim 3, wherein the reclaiming step comprises:
   attempting a reclaiming action by the second software component, wherein the reclaiming action is at least one of a purging, a compressing, and a relocating action on a set of files in the data processing system, and wherein, if attempting the reclaiming action does not result in a sum of a size of the reclaimed space and a size of the allocated dump file space being at least equal to the estimated dump file size, notifying a user by a third software component.

5. The computer implemented method of claim 3 further comprising:
   notifying by a third software component about the detected event, the estimated dump file size, the comparison, the reclaimed space, and the expanded dump file space.

6. The computer implemented method of claim 1, wherein the event is an expansion of a use of memory by a process beyond a predetermined period of time.

7. The computer implemented method of claim 1, further comprising:
   displaying a graphical user interface screen, on which is displayed: that includes
   a field for receiving the indication of the event scanning interval, wherein the event scanning interval specifies multiples times at which to scan for events that have a potential to cause a dump;
   a field for receiving the indication of the storage space scanning interval;
   a field for receiving an indication that a system application programming interface (API) should be used to monitor the data processing system's resource usage;

a field for receiving an indication of a method to use to notify a user, wherein the user may be notified using one of an email address and a telephone number;

a field for receiving an indication that storage space should be freed automatically;

a field for receiving an indication that an administrator should be notified when storage space needs to be freed; and a field for receiving an indication that a user should be notified when the event that has the potential to cause the dump has been detected.

8. A computer readable medium on which is stored computer usable code for adjusting a dump file space in a data processing system, the computer readable medium comprising:

computer usable code for allocating the dump file space in a storage space at a startup of the data processing system;

computer usable code for receiving an indication of a storage space scanning interval;

in response to each end of the storage space scanning interval, computer usable code for scanning the storage space to determine if free space is available in the storage space into which the dump file space can be expanded;

computer usable code for receiving an indication of an event scanning interval; and in response to each end of the event scanning interval, computer usable code for determining if an event that has a potential to cause a dump has been detected;

in response to computer usable code detecting the event:

computer usable code for estimating a size of a dump file to form an estimated dump file size;

computer usable code for comparing a size of the allocated dump file space to the estimated dump file size to determine if the estimated dump file size exceeds the size of the allocated dump file space; and computer usable code, responsive to determining that free space is available in the storage space and to determining that the estimated dump file size exceeds the size of the allocated dump file space for expanding the allocated dump file space into the free space to form an expanded dump file space.

9. The computer readable medium of claim 8, wherein the computer usable code for detecting comprises:

in response to receiving an indication that a system application programming interface (API) should be used to monitor the data processing system's resource usage, computer usable program code for continuously monitoring for events generated by an operating system that have a potential to cause a dump; and in response to detecting events that have the potential to cause a dump, computer usable program code for performing the estimating, comparing, and expanding steps.

10. The computer readable medium of claim 8, wherein the computer usable code for expanding comprises:

computer usable code for reclaiming storage space if the size of the allocated dump file space is less than the estimated dump file size to form a reclaimed space; and computer usable program code for expanding, by the second software component, the dump file space into the reclaimed space to form the expanded dump file space.

11. The computer readable medium of claim 10, wherein the computer usable code for reclaiming comprises:

computer usable code for attempting a reclaiming action, wherein the reclaiming action is at least one of a purging, a compressing, and a relocating action on a set of files in the data processing system, and wherein, if attempting the reclaiming action does not result in a sum of a size of the reclaimed space and a size of the allocated dump file space being at least equal to the estimated dump file size, computer usable code for notifying a user.

12. The computer readable medium of claim 10 further comprising:

computer usable code for notifying about the detected event, the estimated dump file size, the comparison, the reclaimed space, and the expanded dump file space.

13. The computer readable medium of claim 8, wherein the event is the expansion of a use of memory by a process beyond a predetermined period of time.

14. The computer readable medium of claim 8, further comprising:

computer usable code for displaying a graphical user interface screen, on which is displayed:

a field for receiving the indication of the event scanning interval, wherein the event scanning interval specifies multiples times at which to scan for events that have a potential to cause a dump;

a field for receiving the indication of the storage space scanning interval;

a field for receiving an indication that a system application programming interface (API) should be used to monitor the data processing system's resource usage;

a field for receiving an indication of a method to use to notify a user, wherein the user may be notified using one of an email address and a telephone number;

a field for receiving an indication that storage space should be freed automatically;

a field for receiving an indication that an administrator should be notified when storage space needs to be freed; and a field for receiving an indication that a user should be notified when the event that has the potential to cause the dump has been detected.

15. A data processing system for adjusting a dump file space in a data processing system, comprising:

a storage device, wherein the storage device stores computer usable program code; and a processor, wherein the processor executes the computer usable program code, and wherein the computer usable program code comprises:

computer usable code for allocating the dump file space in a storage space at a startup of the data processing system;

computer usable code for receiving an indication of a storage space scanning interval;

in response to each end of the storage space scanning interval, computer usable code for scanning the storage space to determine if free space is available in the storage space into which the dump file space can be expanded;

computer usable code for receiving an indication of an event scanning interval; and in response to each end of the event scanning interval, computer usable code for determining if an event that has a potential to cause a dump has been detected;

in response to the computer usable code detecting the event:

computer usable code for estimating, by a first software component, a size of a dump file to form an estimated dump file size;

computer usable code for comparing in the first software component a size of the allocated dump file space to the estimated dump file size to determine if the estimated dump file size exceeds the size of the allocated dump file space; and in response to the computer usable code determining that free space is available in the storage space and to the computer usable code determining that the estimated dump file size exceeds the size of the allocated dump file space: computer usable code for expanding, by a second software component, the allocated dump file space into the free space to form an expanded dump file space.

16. The data processing system of claim 15, wherein the computer usable code for detecting comprises:

in response to receiving an indication that a system application programming interface (API) should be used to monitor the data processing system's resource usage, computer usable code for continuously monitoring for events generated by an operating system that have a potential to cause a dump; and in response to detecting events that have the potential to cause a dump, computer usable code for performing the estimating, comparing, and expanding steps.

17. The data processing system of claim 15, wherein the event is the expansion of memory by a process beyond a predetermined period of time.

18. The data processing system of claim 15, further comprising:

a display for displaying a graphical user interface screen, on which is displayed;

a field for receiving the indication of the event scanning interval, wherein the event scanning interval specifies multiples times at which to scan for events that have a potential to cause a dump;

a field for receiving the indication of the storage space scanning interval;

a field for receiving an indication that a system application programming interface (API) should be used to monitor the data processing system's resource usage;

a field for receiving an indication of a method to use to notify a user, wherein the user may be notified using one of an email address and a telephone number;

a field for receiving an indication that storage space should be freed automatically;

a field for receiving an indication that an administrator should be notified when storage space needs to be freed; and a field for receiving an indication that a user should be notified when the event that has the potential to cause the dump has been detected.

* * * * *